United States Patent [19]

Okamoto

[11] Patent Number: 5,780,179

[45] Date of Patent: Jul. 14, 1998

[54] FUEL CELL SYSTEM FOR USE ON MOBILE BODIES

[75] Inventor: Takafumi Okamoto, Wako, Japan

[73] Assignee: Honda Giken Kogyo Kabushiki Kaisha, Tokyo, Japan

[21] Appl. No.: 668,300

[22] Filed: Jun. 25, 1996

[30] Foreign Application Priority Data

Jun. 26, 1995 [JP] Japan .................. 7-159613

[51] Int. Cl.⁶ ........................................ H01M 8/06
[52] U.S. Cl. ................................ 429/20; 429/30
[58] Field of Search .................. 429/17, 20, 30

[56] References Cited

U.S. PATENT DOCUMENTS 4,533,607  8/1985  Sederquist .................... 429/17 X
4,769,297  9/1988  Reiser et al. .................. 429/30 X
5,360,679  11/1994  Buswell et al. .............. 429/30 X
5,441,821  8/1995  Merritt et al. ................ 429/17
5,543,238  8/1996  Strasser ......................... 429/30 X

*Primary Examiner*—Stephen Kalafut
*Attorney, Agent, or Firm*—Lyon & Lyon LLP

[57] ABSTRACT

A fuel cell system has a reformer, a water tank for supplying water to humidify a hydrogen gas and an oxidizing gas which has been reformed by the reformer, a fuel cell for being supplied with the humidified hydrogen gas, and first and second gas-liquid separators for separating substances discharged from the fuel cell into gases and water, and supplying the separated water to the water tank. The fuel cell system needs no water supply from an external source and can continuously supply the water from the water tank to the fuel cell.

19 Claims, 4 Drawing Sheets

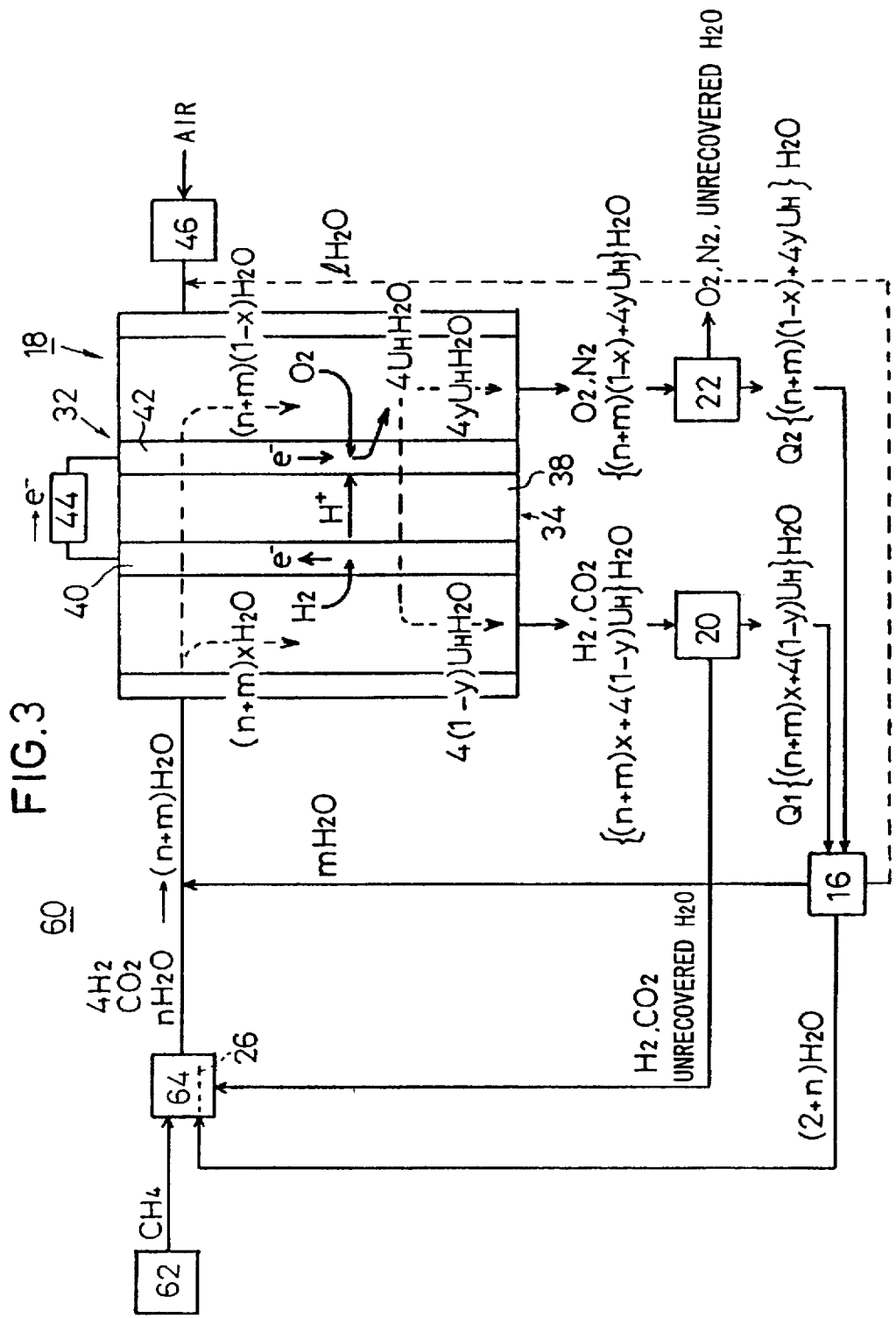

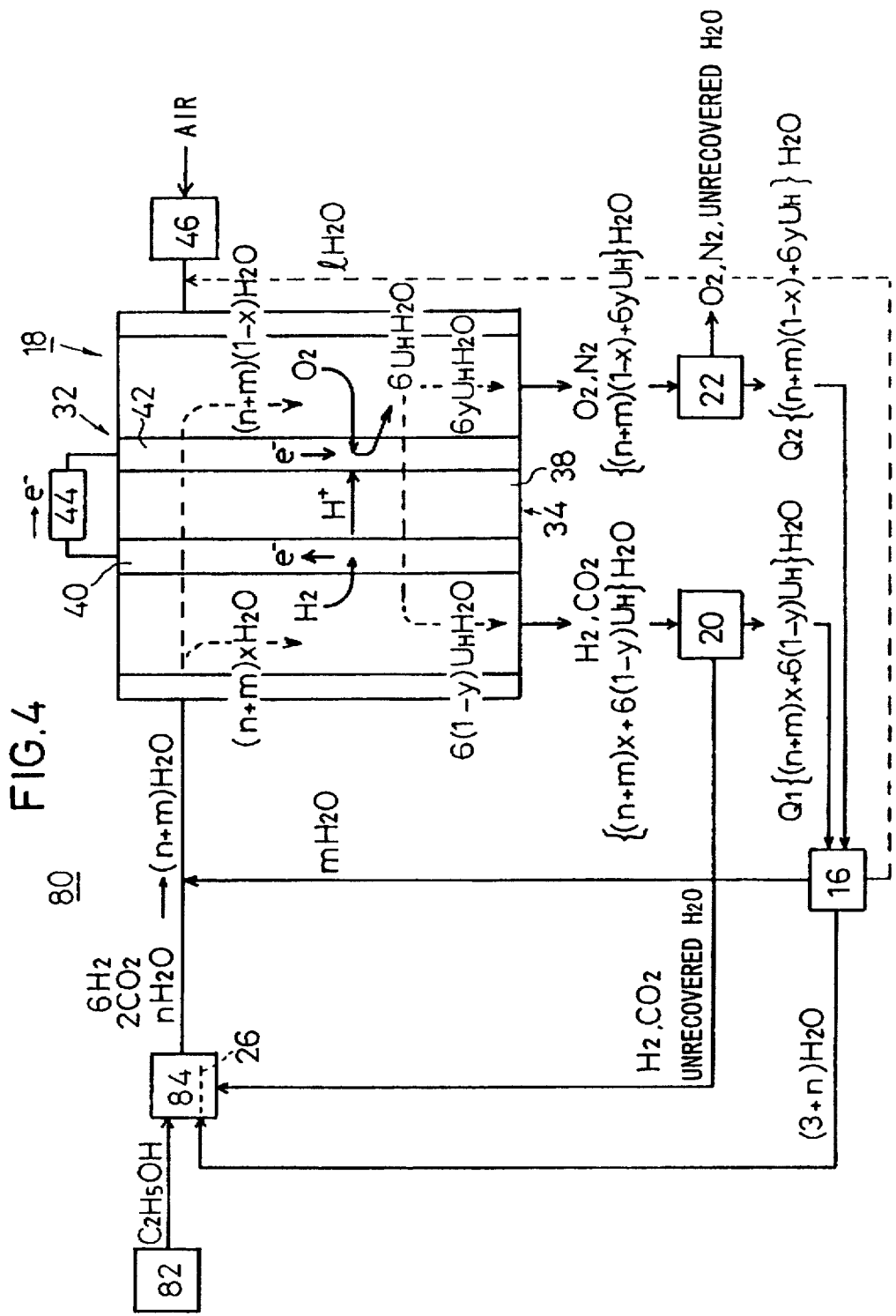

FUEL CELL SYSTEM FOR USE ON MOBILE BODIES

BACKGROUND OF THE INVENTION

1. Field of the Invention

The present invention relates to a fuel cell system for use on mobile bodies which includes a fuel cell that can be operated by a supplied fuel gas such as a hydrogen gas or the like.

2. Description of the Related Art

There have been developed fuel cells comprising a plurality of stacked fuel cells each having an ion exchange polyelectrolyte membrane sandwiched between an anode and a cathode which are positioned between separators. In some applications, such fuel cells are used as energy sources on mobile bodies including automobiles, motorcycles, portable generators, and stationary generators.

In the fuel cells, a hydrogen gas generated by steam reforming of methanol is supplied as a fuel gas to the anode whereas a gas is supplied as an oxidizing gas (for example, air) to the cathode. The supplied hydrogen gas is ionized and passes through the ion exchange membrane to produce electric energy available outside of the fuel cells.

In order to enable the fuel cells to generate electric energy, it is necessary to keep the ion exchange membrane and ion conductive elements under a constant wet state at all times. To meet such a requirement, it is customary to humidify the supply fuel gas with water and then supply the humidified fuel gas to the fuel cells. The fuel cells require such humidifying water to be supplied from an external water source, and also need additional water for steam reforming of hydrocarbon fuels such as methanol, methane, ethanol, or the like, and cooling the stack of fuel cells. Therefore, electric vehicles, portable generators, etc. which use such fuel cells are expected to suffer a complex process of supplying water to the fuel cells.

SUMMARY OF THE INVENTION

It is a major object of the present invention to provide a fuel cell system for use on mobile bodies which is capable of continuously supplying humidifying water to a fuel cell without the need for an external source of water.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a block diagram showing various chemical reactions in a fuel cell system according to a second embodiment of the present invention; and FIG. 4 is a block diagram showing various chemical reactions in a fuel cell system according to a third embodiment of the present invention.

DETAILED DESCRIPTION OF THE PREFERRED EMBODIMENTS

Figure 1:
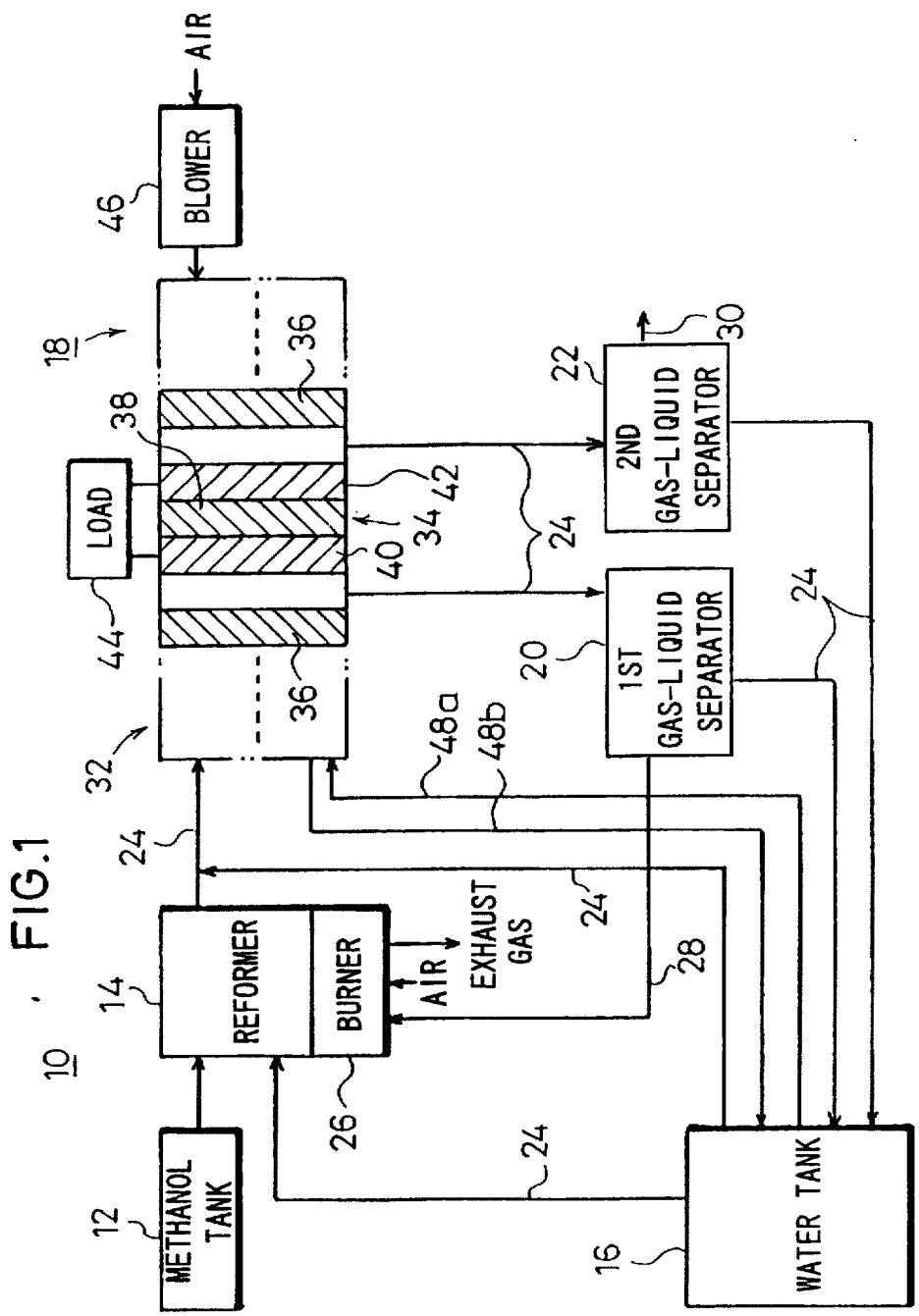
FIG. 1 is a block diagram of a fuel cell system according to a first embodiment of the present invention.

As shown in FIG. 1, a fuel cell system 10 according to a first embodiment of the present invention generally comprises a reformer 14 for steam-reforming methanol supplied from a methanol tank 12, a water tank or reservoir 16 for supplying water to the reformer 14 and also supplying water for humidifying a hydrogen gas, i.e., a fuel gas, and a carbon dioxide gas discharged from the reformer 14, a fuel cell 18 which is supplied with the hydrogen gas and the carbon dioxide gas that have been humidified, and a pair of first and second gas-liquid separators 20, 22 for separating substances discharged from the fuel cell 18 into gases and water and supplying the separated water to the water tank 16.

The water tank 16, the reformer 14, the fuel cell 18, and the first and second gas-liquid separators 20, 22 communicate with each other through passages 24.

The reformer 14 has a burner 26 which is supplied with unreacted hydrogen, carbon dioxide, etc. from the first gas-liquid separator 20 through a passage 28 and also with air and, if necessary, unreacted oxygen, nitrogen, etc. from the second gas-liquid separator 22 through a passage 30. Each of the first and second gas-liquid separators 20, 22 comprises a cooling unit such as a radiator, for example.

The fuel cell 18 comprises a stack of fuel cells 32 each having an electrode structural body 34 and a pair of separators 36 sandwiching the electrode structural body 34 therebetween.

The electrode structural body 34 comprises an ion exchange membrane 38, a hydrogen electrode (anode) 40 disposed on one side of the ion exchange membrane 38, and an air electrode (cathode) 42 disposed on the other side of the ion exchange membrane 38. The hydrogen electrode 40 and the air electrode 42, which sandwich the ion exchange membrane 38 therebetween, are connected to an electric load 44 such as an electric motor or the like.

The separators 36 have pores defined therein for delivering a hydrogen gas and air (oxidizing gas) supplied from a blower 46 to the electrode structural body 34, and also cooling spaces (not shown) communicating with the water tank 16 through passages 48a, 48b.

The fuel cell 18 has a hydrogen gas utilization ratio set to 33% or greater as described later on.

Operation of the fuel cell system 10 of the above structure will be described below.

Figure 2:
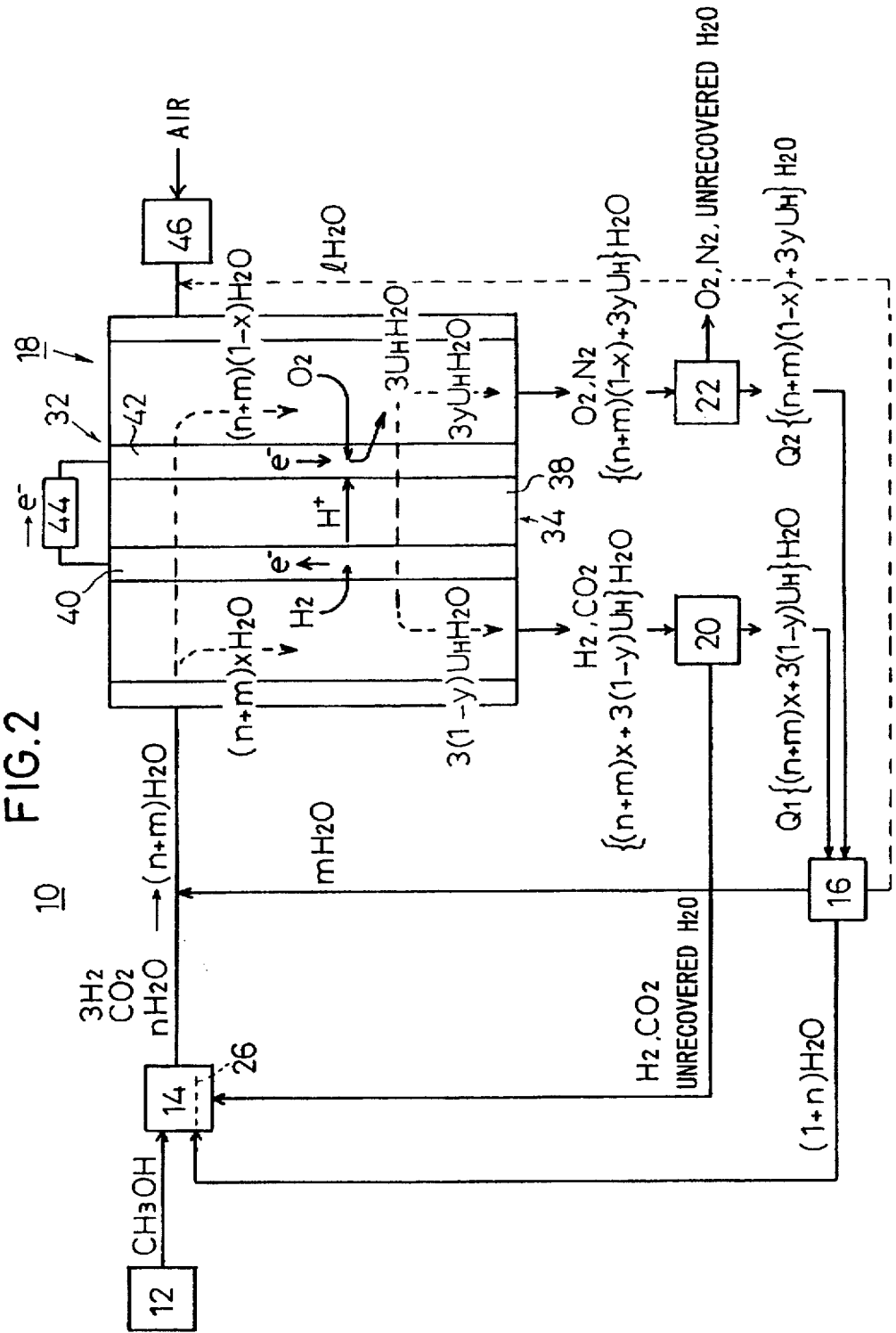
FIG. 2 is a block diagram showing various chemical reactions in the fuel cell system according to the first embodiment shown in FIG. 1.

As shown in FIG. 2, the reformer 14 is supplied with methanol ($CH_3OH$) from the methanol tank 12 and water from the water tank 16, and operates to reform the methanol with steam while being heated by the burner 26. The reaction of steam reforming of the methanol in the reformer 14 is represented by the following chemical formula (1):

$$CH_3OH + (1+n)H_2O \rightarrow 3H_2 + CO_2 + nH_2O \quad (n \geq 0) \qquad (1)$$

where n represents a surplus, and is set to a value smaller than 1, e.g., 0.3.

After the methanol is reformed with steam, water ($mH_2O$) is added thereto from the water tank 16. Therefore, an operating gas supplied from the reformer 14 to the hydrogen electrode 40 of the fuel cell 18 has the composition of $3H_2 + CO_2 + (n+m)H_2O$. Thus, a hydrogen gas has been humidified.

Part of the water in the operating gas introduced into the fuel cell 18 passes through the electrode structural body 34 toward the air electrode 42. If the permeability of the electrode structural body 34 with respect to water is represented by $(1-x)$ ($0 < x < 1$), then the water in the operating gas which remains in the hydrogen electrode 40 is represented by $(n+m)xH_2O$, and the water in the operating gas which passes toward the air electrode 42 is represented by $(n+m)(1-x)H_2O$.

The hydrogen gas in the operating gas is ionized, and flows through the ion exchange membrane 38 toward the air electrode 42. In the air electrode 42, the hydrogen ions react with oxygen and electrons, generating water. If the fuel cell 18 has a hydrogen (fuel) utilization ratio of $U_H$, then water $3U_H \cdot H_2O$ represented by the following formula (2) is generated:

$$3H_2 \cdot U_H + 3/2 \cdot O_2 \cdot U_H = 3U_H \cdot H_2O \quad (2)$$

The hydrogen (fuel) utilization ratio of $U_H$ is defined as the ratio of the amount of a hydrogen gas (the amount of a fuel gas) consumed by the fuel cell for generation of electric energy to the amount of a hydrogen gas (the amount of a fuel gas) supplied to the fuel cell.

Part of the generated water passes through the electrode structural body 42 toward the hydrogen electrode 40. If the permeability of the electrode structural body 42 with respect to the generated water is represented by (1-y) (0<y<1), then the generated water which remains in the air electrode 42 is represented by $3yU_H H_2O$, and the generated water which passes toward the hydrogen electrode 40 is represented by $3(1-y)U_H H_2O$.

Therefore, substances discharged from the hydrogen electrode 40 of the fuel cell 18 include an unreacted hydrogen gas, a carbon dioxide gas, and $\{(n+m)x+3(1-y)U_H\}H_2O$, and substances discharged from the air electrode 42 include an unreacted oxygen gas, a nitrogen dioxide gas, and $\{(n+m)(1-x)+3yU_H\}H_2O$.

The substances discharged from the hydrogen electrode 40 of the fuel cell 18 are introduced into the first gas-liquid separator 20, which separate the substances into gases and water. The substances discharged from the air electrode 42 are introduced into the second gas-liquid separator 22, which separate the substances into gases and water.

If the first and second gas-liquid separators 20, 22 have respective water recovery factors $Q_1$, $Q_2$, then the water recovered by the first gas-liquid separator 20 is represented by $Q_1\{(n+m)x+3(1-y)U_H\}H_2O$, and the water recovered by the second gas-liquid separator 22 is represented by $Q_2\{(n+m)(1-x)+3yU_H\}H_2O$. The recovered water is supplied from the first and second gas-liquid separators 20, 22 through the passages 24 to the water tank 16.

The unreacted hydrogen gas, the carbon dioxide gas, and the unrecovered water which are separated by the first gas-liquid separator 20 are delivered through the passage 28 to the burner 26, and used for combustion and temperature maintenance for ethanol reforming. The unreacted oxygen gas, the nitrogen gas, and the unrecovered water which are separated by the second gas-liquid separator 22 are discharged through the passage 30 or delivered to the burner 26.

The water tank 16 supplies water to the separators 36 and recovers water from the separators 36. Since the amount of water recovered from the separators 36 does not increase and decrease, the transfer of water to and from the separators 36 is not taken into account. Thus, the overall amount of water discharged from the water tank 16 is represented by $(1+n+m)H_2O$, and the overall amount of water introduced into the water tank 16 is represented by $$Q_1\{(n+m)x+3(1-y)U_H\}H_2O+Q_2\{(n+m)(1-x)+3yU_H\}H_2O.$$

Therefore, if the overall amount of water discharged from the water tank 16 is smaller than the overall amount of water introduced into the water tank 16, then the amount of water contained in the water tank 16 is not reduced, and no water needs to be supplied from an external source outside of the fuel cell system 10. To keep the fuel cell system 10 free of the supply of water from an external source, the following formula (3) should be satisfied:

$$(1+n+m)H_2O \leq Q_1\{(n+m)x+3(1-y)U_H\}H_2O+Q_2\{(n+m)(1-x)+3yU_H\}H_2O \quad (3)$$

When the water recovery factors $Q_1$, $Q_2$ of the first and second gas-liquid separators 20, 22 are maximum, i.e., $Q_1=Q_2=1$, the efficiency of the water circulation system of the fuel cell system 10 is maximum. By substituting $Q_1=Q_2=1$ in the formula (3), the following formula is obtained:

$$U_H \geq \tfrac{1}{3} \quad (4)$$

The supply and recovery of water has been described above with respect to only the humidification of the fuel gas (hydrogen gas). Since the water simply passes through the fuel cell, and cancels out each other on both sides of the formula (3), the formula (4) is also satisfied when the oxidizing gas (air) is humidified. Specifically, if the water used to humidify the oxidizing gas is represented by 1 and the permeability of the electrode structural body 34 is represented by (1-z) (0<Z<1), then the following formula (5) is satisfied:

$$(1+n+m+1)H_2O \leq Q_1\{(n+m)x+3(1-y)U_H+1(1-Z)\}H_2O + Q_2\{(n+m)(1-x)+3yU_H+1Z\}H_2O \quad (5)$$

From the formula (5) is derived the formula (4).

Even though the efficiency of the water circulation system is maximum, if the hydrogen gas utilization ratio is less than 33%, then the water in the fuel cell system 10 is reduced, and hence a fuel cell electric vehicle, for example, which incorporates the fuel cell system 10, needs to be supplied with water from an external source in addition to the fuel of methanol.

According to the first embodiment, therefore, when the power plant that is energized by the fuel cell 18 is operated such that the hydrogen gas utilization ratio is 33% or higher and is equal to or greater than a value corresponding to the water factors of the first and second gas-liquid separators 20, 22, the fuel cell system 10 needs no water supply from an external source and can continuously utilize the water in the water tank 16. The hydrogen gas utilization ratio can be adjusted by controlling the amount of a fuel gas and the amount of an oxidizing gas which are supplied per unit time.

In the first embodiment, as described above, the water that passes through the fuel cell 18 and the water generated in the fuel cell 18 are separated from the gases by the first and second gas-liquid separators 20, 22, and supplied to the water tank 16. Consequently, the efficiency with which water is utilized in the fuel cell system 10 is greatly improved.

By setting the hydrogen gas utilization ratio of the fuel cell 18 to 33% or greater, the amount of water discharged from the water tank 16 can be made greater than the amount of water delivered to the water tank 16. Therefore, it is not necessary to introduce water from an external source into the fuel cell system 10, and hence a fuel cell electric vehicle, for example, which incorporates the fuel cell system 10, can be handled with increased ease.

FIG. 3 shows in block various chemical reactions in a fuel cell system 60 according to a second embodiment of the present invention. Those parts of the fuel cell system 60 shown in FIG. 3 which are identical to those shown in FIGS. 1 and 2 are denoted by identical reference numerals, and will not be described in detail below.

According to the second embodiment, the fuel cell system 60 has a reformer 64 for steam-reforming methane supplied from a methane tank 62, and the hydrogen gas utilization ratio of the fuel cell 18 is set to 50% or higher.

The fuel cell system 60 operates as follows: The reformer 64 is supplied with methane ($CH_4$) from the methane tank 62 and water from the water tank 16, and operates to reform the methane with steam while being heated by the burner 26. The reaction of steam reforming of the methane in the reformer 64 is represented by the following chemical formula (6):

$$CH_4+(2+n)H_2O \rightarrow 4H_2+CO_2+nH_2O \quad (n \geq 0) \qquad (6)$$

After the methane is reformed with steam, water ($mH_2O$) is added thereto from the water tank 16. Therefore, an operating gas supplied from the reformer 64 to the hydrogen electrode 40 of the fuel cell 18 has the composition of $4H_2+CO_2+(n+m)H_2O$. Part of the water in the operating gas introduced into the fuel cell 18 passes through the electrode structural body 34 toward the air electrode 42. The water in the operating gas which remains in the hydrogen electrode 40 is represented by $(n+m)xH_2O$, and the water in the operating gas which passes toward the air electrode 42 is represented by $(n+m)(1-x)H_2O$.

The hydrogen gas in the operating gas is ionized, and flows through the ion exchange membrane 38 toward the air electrode 42. In the air electrode 42, the hydrogen ions react with oxygen and electrons, generating water. Water $4U_H \cdot H_2O$ represented by the following formula (7) is generated:

$$4H_2 \cdot U_H + 2 \cdot O_2 \cdot U_H = 4U_H \cdot H_2O \qquad (7)$$

Part of the generated water passes through the electrode structural body 34 toward the hydrogen electrode 40. The generated water which remains in the air electrode 42 is represented by $4yU_H H_2O$, and the generated water which passes toward the hydrogen electrode 40 is represented by $4(1-y)U_H H_2O$.

Therefore, substances discharged from the hydrogen electrode 40 of the fuel cell 18 include an unreacted hydrogen gas, a carbon dioxide gas, and $\{(n+m)x+4(1y)U_H\}H_2O$, and substances discharged from the air electrode 42 include an unreacted oxygen gas, a nitrogen dioxide gas, and $\{(n+m)(1-x)+4yU_H\}H_2O$.

The substances discharged from the hydrogen electrode 40 of the fuel cell 18 are introduced into the first gas-liquid separator 20, which separate the substances into gases and water. The substances discharged from the air electrode 42 are introduced into the second gas-liquid separator 22, which separate the substances into gases and water.

The water recovered by the first gas-liquid separator 20 is represented by $Q_1\{(n+m)x+4(1-y)U_H\}H_2O$, and the water recovered by the second gas-liquid separator 22 is represented by $Q_2\{(n+m)(1-x)+4yU_H\}H_2O$. The recovered water is supplied from the first and second gas-liquid separators 20, 22 through the passages 24 to the water tank 16.

The overall amount of water discharged from the water tank 16 is represented by $(2+n+m)H_2O$, and the overall amount of water introduced into the water tank 16 is represented by $Q_1\{(n+m)x+4(1-y)U_H\}H_2O+Q_2\{(n+m)(1-x)+4yU_H\}H_2O$. Therefore, if the overall amount of water discharged from the water tank 16 is smaller than the overall amount of water introduced into the water tank 16, then the amount of water contained in the water tank 16 is not reduced, and no water needs to be supplied from an external source outside of the fuel cell system 60. To keep the fuel cell system 60 free of the supply of water from an external source, the following formula (8) should be satisfied:

$$(2+n+m)H_2O \leq Q_1\{(n+m)x+4(1-y)U_H\}H_2O+Q_2\{(n+m)(1-x)+4yU_H\}H_2O \qquad (8)$$

When the water recovery factors $Q_1$, $Q_2$ of the first and second gas-liquid separators 20, 22 are maximum, i.e., $Q_1=Q_2=1$, the efficiency of the water circulation system of the fuel cell system 60 is maximum. By substituting $Q_1=Q_2=1$ in the formula (8), the following formula is obtained:

$$U_H \geq \tfrac{1}{2} \qquad (9)$$

According to the second embodiment, therefore, when the power plant that is energized by the fuel cell 18 is operated such that the hydrogen gas utilization ratio is 50% or higher and is equal to or greater than a value corresponding to the water factors of the first and second gas-liquid separators 20, 22, the fuel cell system 60 needs no water supply from an external source and can continuously utilize the water in the water tank 16.

FIG. 4 shows in block various chemical reactions in a fuel cell system 80 according to a third embodiment of the present invention. Those parts of the fuel cell system 80 shown in FIG. 4 which are identical to those shown in FIGS. 1 and 2 are denoted by identical reference numerals, and will not be described in detail below.

According to the third embodiment, the fuel cell system 80 has a reformer 84 for steam-reforming ethanol supplied from an ethanol tank 82, and the hydrogen gas utilization ratio of the fuel cell 18 is set to 50% or higher.

The fuel cell system 80 operates as follows: The reformer 84 is supplied with ethanol ($C_2H_5OH$) from the ethanol tank 82 and water from the water tank 16, and operates to reform the ethanol with steam while being heated by the burner 26. The reaction of steam reforming of the ethanol in the reformer 84 is represented by the following chemical formula (10):

$$(C_2H_5OH)+(3+n)H_2O \rightarrow 6H_2+2CO_2+nH_2O \quad (n \geq 0) \qquad (10)$$

After the ethanol is reformed with steam, water ($mH_2O$) is added thereto from the water tank 16. Therefore, an operating gas supplied from the reformer 84 to the hydrogen electrode 40 of the fuel cell 18 has the composition of $6H_2+2CO_2+(n+m)H_2O$. Part of the water in the operating gas introduced into the fuel cell 18 passes through the electrode structural body 34 toward the air electrode 42. The water in the operating gas which remains in the hydrogen electrode 40 is represented by $(n+m)xH_2O$, and the water in the operating gas which passes toward the air electrode 42 is represented by $(n+m)(1-x)H_2O$.

The hydrogen gas in the operating gas is ionized, and flows through the ion exchange membrane 38 toward the air electrode 42. In the air electrode 42, the hydrogen ions react with oxygen and electrons, generating water. Water $6U_H \cdot H_2O$ represented by the following formula (11) is generated:

$$6H_2 \cdot U_H + 3O_2 \cdot U_H = 6U_H \cdot H_2O \qquad (11)$$

Part of the generated water passes through the electrode structural body 34 toward the hydrogen electrode 40. The generated water which remains in the air electrode 42 is represented by $6yU_H H_2O$, and the generated water which passes toward the hydrogen electrode 40 is represented by $6(1-y)U_H H_2O$.

Therefore, substances discharged from the hydrogen electrode 40 of the fuel cell 18 include an unreacted hydrogen gas, a carbon dioxide gas, and $\{(n+m)x+6(1y)U_H\}H_2O$, and substances discharged from the air electrode 42 include an unreacted oxygen gas, a nitrogen dioxide gas, and $\{(n+m)(1-x)+6yU_H\}H_2O$.

The substances discharged from the hydrogen electrode 40 of the fuel cell 18 are introduced into the first gas-liquid separator 20, which separate the substances into gases and water. The substances discharged from the air electrode 42 are introduced into the second gas-liquid separator 22, which separate the substances into gases and water.

The water recovered by the first gas-liquid separator 20 is represented by $Q_1\{(n+m)x+6(1-y)U_H\}H_2O$, and the water recovered by the second gas-liquid separator 22 is represented by $Q_2\{(n+m)(1-x)+6yU_H\}H_2O$. The recovered water is supplied from the first and second gas-liquid separators 20, 22 through the passages 24 to the water tank 16.

The overall amount of water discharged from the water tank 16 is represented by $(3+n+m)H_2O$, and the overall amount of water introduced into the water tank 16 is represented by $Q_1\{(n+m)x+6(1-y)U_H\}H_2O+Q_2\{(n+m)(1-x)+6yU_H\}H_2O$. Therefore, if the overall amount of water discharged from the water tank 16 is smaller than the overall amount of water introduced into the water tank 16, then the amount of water contained in the water tank 16 is not reduced, and no water needs to be supplied from an external source outside of the fuel cell system 80. To keep the fuel cell system 80 free of the supply of water from an external source, the following formula (12) should be satisfied:

$$(3+n+m)H_2O \leq Q_1\{(n+m)x+6(1-y)U_H\}H_2O+Q_2\{(n+m)(1-x)+6yU_H\}H_2O \quad (12)$$

When the water recovery factors $Q_1$, $Q_2$ of the first and second gas-liquid separators 20, 22 are maximum, i.e., $Q_1=Q_2=1$, the efficiency of the water circulation system of the fuel cell system 60 is maximum. By substituting $Q_1=Q_2=1$ in the formula (12), the following formula is obtained:

$$U_H \geq \frac{1}{2} \quad (13)$$

According to the third embodiment, therefore, when the power plant that is energized by the fuel cell 18 is operated such that the hydrogen gas utilization ratio is 50% or higher and is equal to or greater than a value corresponding to the water factors of the first and second gas-liquid separators 20, 22, the fuel cell system 80 needs no water supply from an external source and can continuously utilize the water in the water tank 16.

The fuel cell systems according to the present invention offer the following advantages:

The fuel gas supplied to the fuel cell reacts, generating water, and the generated water is introduced, together with other discharged substances, into the gas-liquid separators. The water is separated from the other discharged substances by the gas-liquid separators and supplied to the water tank. The water generated by reactions in the fuel cell can be used for humidifying water, steam reforming of a hydrocarbon such as methanol, methane, ethanol, or the like, and cooling the stack of fuel cells. The water which is used in the fuel cell system as a whole is not required to be supplied from an external source outside of the fuel cell system.

Although certain preferred embodiments of the present invention have been shown and described in detail, it should be understood that various changes and modifications may be made therein without departing from the scope of the appended claims.

What is claimed is:

1. A fuel cell system for use on a mobile body, comprising:
    a fuel cell stack comprising a plurality of fuel cells each having an ion exchange membrane, and an anode and a cathode which sandwich said ion exchange membrane therebetween;
    a water reservoir for storing water to humidify a fuel gas to be supplied to said fuel cell stack;
    gas-liquid separating means for separating substances discharged from said fuel cell stack into gases and water and supplying the separated water to said water reservoir; and
    a reformer for reforming a hydrocarbon with steam to generate a hydrogen gas as said fuel gas, wherein water is supplied to the reformer from said reservoir for producing said steam, said fuel cell stack having a fuel gas utilization ratio sufficient to cause an amount of the separated water discharged from said fuel cell stack to at least equal an amount of the water being supplied to said fuel cell stack and said reformer.

2. A fuel cell system according to claim 1, wherein said gas-liquid separating means comprises:
    first gas-liquid separating means for separating substances discharged from said anode into gases and water; and
    second gas-liquid separating means for separating substances discharged from said cathode into gases and water.

3. A fuel cell system according to claim 2, wherein each of said first gas-liquid separating means and said second gas-liquid separating means comprises a cooling unit.

4. A fuel cell system according to claim 1, wherein said reformer is supplied with methanol for reforming said methanol with steam to generate a hydrogen gas as said fuel gas, said fuel cell stack having a fuel gas utilization ratio of at least 33%.

5. A fuel cell system according to claim 1, wherein said reformer is supplied with methane for reforming said methane with steam to generate a hydrogen gas as said fuel gas, said fuel cell stack having a fuel gas utilization ratio of at least 50%.

6. A fuel cell system according to claim 1, wherein said reformer is supplied with ethanol for reforming said ethanol with steam to generate a hydrogen gas as said fuel gas, said fuel cell stack having a fuel gas utilization ratio of at least 50%.

7. A fuel cell system for use on a mobile body, comprising:
    a fuel cell stack comprising a plurality of fuel cells each having an ion exchange membrane, and an anode and a cathode which sandwich said ion exchange membrane therebetween;
    a water reservoir for storing water to humidify an oxidizing gas to be supplied to said fuel cell stack;
    gas-liquid separating means for separating substances discharged from said fuel cell stack into gases and water and supplying the separated water to said water reservoir; and
    a reformer for reforming a hydrocarbon with steam to generate a hydrogen gas as said fuel gas, wherein water is supplied to the reformer from said reservoir for producing said steam, said fuel cell stack having a fuel gas utilization ratio sufficient to cause an amount of the separated water discharged from said fuel cell stack to at least equal an amount of the water being supplied to said fuel cell stack and said reformer.

8. A fuel cell system according to claim 7, wherein said gas-liquid separating means comprises:

first gas-liquid separating means for separating substances discharged from said anode into gases and water; and second gas-liquid separating means for separating substances discharged from said cathode into gases and water.

9. A fuel cell system according to claim 8, wherein each of said first gas-liquid separating means and said second gas-liquid separating means comprises a cooling unit.

10. A fuel cell system according to claim 7, wherein said reformer is supplied with methanol for reforming said methanol with steam to generate a hydrogen gas as said fuel gas, said fuel cell stack having a fuel gas utilization ratio of at least 33%.

11. A fuel cell system according to claim 7, wherein said reformer is supplied with methane for reforming said methane with steam to generate a hydrogen gas as said fuel gas, said fuel cell stack having a fuel gas utilization ratio of at least 50%.

12. A fuel cell system according to claim 7, wherein said reformer is supplied with ethanol for reforming said ethanol with steam to generate a hydrogen gas as said fuel gas, said fuel cell stack having a fuel gas utilization ratio of at least 50%.

13. A fuel cell system for use on a mobile body, comprising:

a fuel cell stack comprising a plurality of fuel cells each having an ion exchange membrane, and an anode and a cathode which sandwich said ion exchange membrane therebetween;

means for supplying water for humidifying a gas being supplied to said fuel cell stack;

separating means for separating water discharged from said fuel cell stack and returning the separated water to said means for supplying water; and a reformer for reforming a hydrocarbon with steam to generate a hydrogen gas as said fuel gas, wherein water is supplied to the reformer from said separating means for producing said steam, said fuel cell stack having a fuel gas utilization ratio sufficient to cause an amount of the separated water discharged from said fuel cell stack to at least equal an amount of the water being supplied to said fuel cell stack and said reformer.

14. A fuel cell system according to claim 13, wherein said gas being supplied to said fuel cell is at least one of either a fuel gas or an oxidizing gas.

15. A fuel cell system according to claim 13, wherein said gas being supplied to said fuel cell includes a fuel gas and an oxidizing gas.

16. A fuel cell system according to claim 13, wherein said separating means comprises:

first gas-liquid separating means for separating substances discharged from said anode into gases and water; and second gas-liquid separating means for separating substances discharged from said cathode into gases and water.

17. A fuel cell system according to claim 16, wherein said separating means comprises a cooling unit.

18. A fuel cell system according to claim 13, wherein said former is supplied with methanol for reforming said methanol with steam to generate a hydrogen gas as said fuel gas, said fuel cell stack having a fuel gas utilization ratio of at least 33%.

19. A fuel cell system according to claim 13, wherein said reformer is supplied with one of methane or ethanol for reforming said methane or ethanol with steam to generate a hydrogen gas as said fuel gas, said fuel cell stack having a fuel gas utilization ratio of at least 50%.

* * * * *